United States Patent [19]

Taylor

[11] Patent Number: 5,248,930
[45] Date of Patent: Sep. 28, 1993

[54] WHEEL WALL ELECTROSTATIC GENERATOR

[75] Inventor: Mark R. Taylor, 718 Church St. Apt. #5, San Francisco, Calif. 94114

[73] Assignee: Mark R. Taylor, San Francisco, Calif.

[21] Appl. No.: 888,342

[22] Filed: May 21, 1992

[51] Int. Cl.5 .............. H02N 1/00; H02K 7/10
[52] U.S. Cl. ................... 322/2 A; 310/75 R; 310/309
[58] Field of Search .............. 322/2 A; 310/309, 75 R

[56] References Cited

U.S. PATENT DOCUMENTS 776,997  12/1904  Burboa .................... 310/309
3,529,185  9/1970  Isoya et al. .............. 322/2 A X Primary Examiner—R. J. Hickey
Attorney, Agent, or Firm—Mark R. Taylor

[57] ABSTRACT

An electrostatic generator developed from the wheel and wheel wall of a car capable of generating very high voltages.

The electric charge is applied to the wheel from the pavement by the motion of the car, then the charge is conveyed on the wheel to a device that collects the charge from the wheel to the spherical conductor that's mounted inside the wheel wall of the car. When sufficient charge is accumulated on the spherical conductor the voltage is then released to an electric motor that can operate off ac, dc, or static electricity. The generator's operation is very similar to that of a Van de Graaff generator.

1 Claim, 3 Drawing Sheets

WHEEL WALL ELECTROSTATIC GENERATOR

BACKGROUND OF THE INVENTION

The primary reason for the invention was to utilize the static electricity created by the motion of cars and trucks in an efficient and in a controlled environment to enable us to generate the high voltages necessary to operate an electric motor or one like it, which is an electric motor that can operate off ac, dc, or static electricity. With current generators you have to add on the additional weight of the generator and the don't utilize the natural motion in the same way.

SUMMARY OF THE INVENTION

My invention eliminates the additional weight of an added on generator and utilizes the natural motion which is apparent from the abstract and the following.

BRIEF DESCRIPTION OF DRAWING FIGURES

FIG. 1 is a simplified perspective diagram of the entire wheel wall electrostatic generator detailing the spherical conductor 1 and the non conductive device 5 thats connected to the suspension 4.

FIG. 2 is a front view detailing the wheel 2, spherical conductor 1, and the comb of pointed electrodes 3.

FIG. 3 is a side view of the pavement 6, wheel 2, spherical conductor 1, and the comb of pointed electrodes 3 to show the entire operation of the invention.

DETAILED DESCRIPTION OF PREFERRED EMBODIMENT

Figure 1:
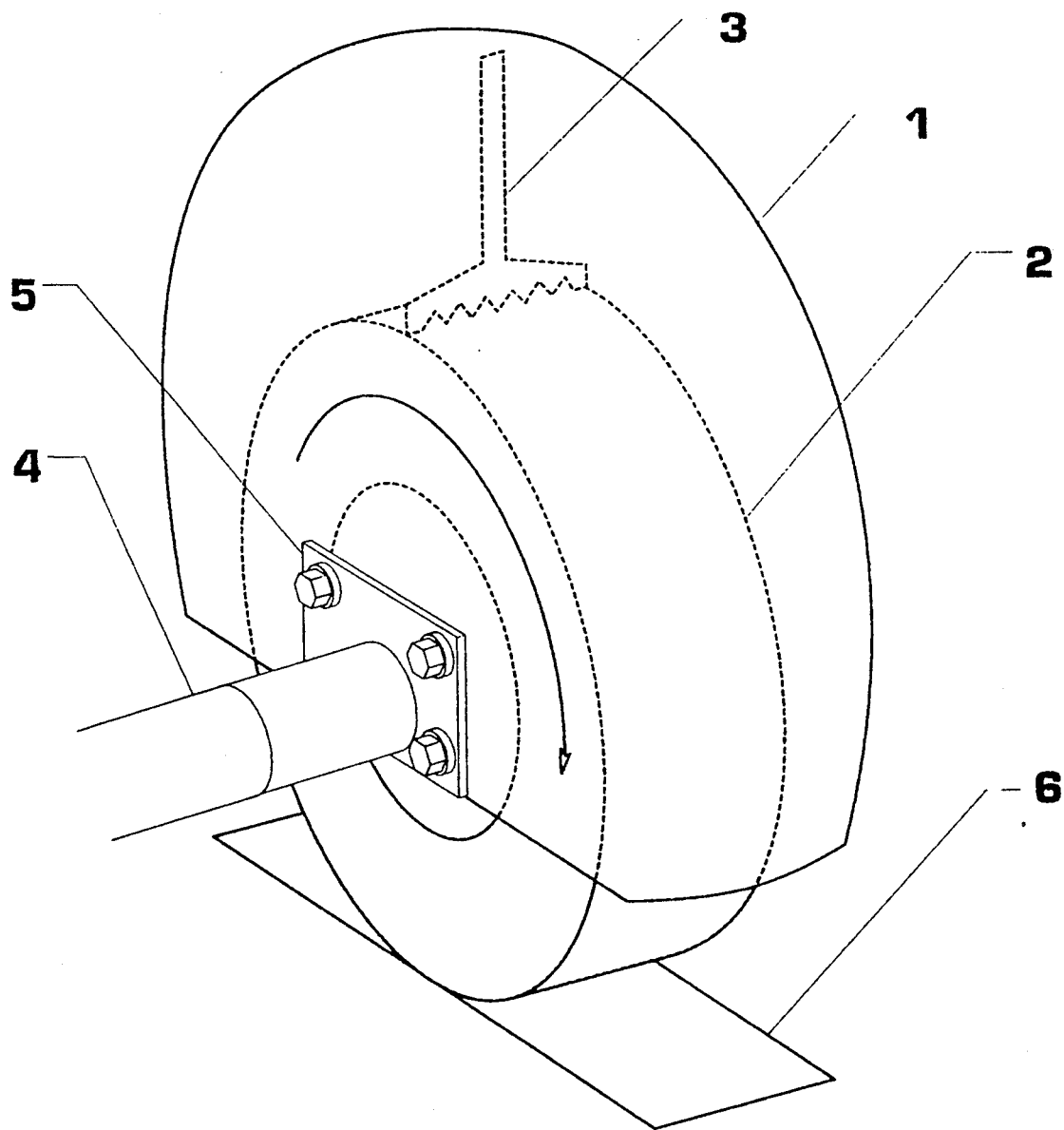
Figure 2:
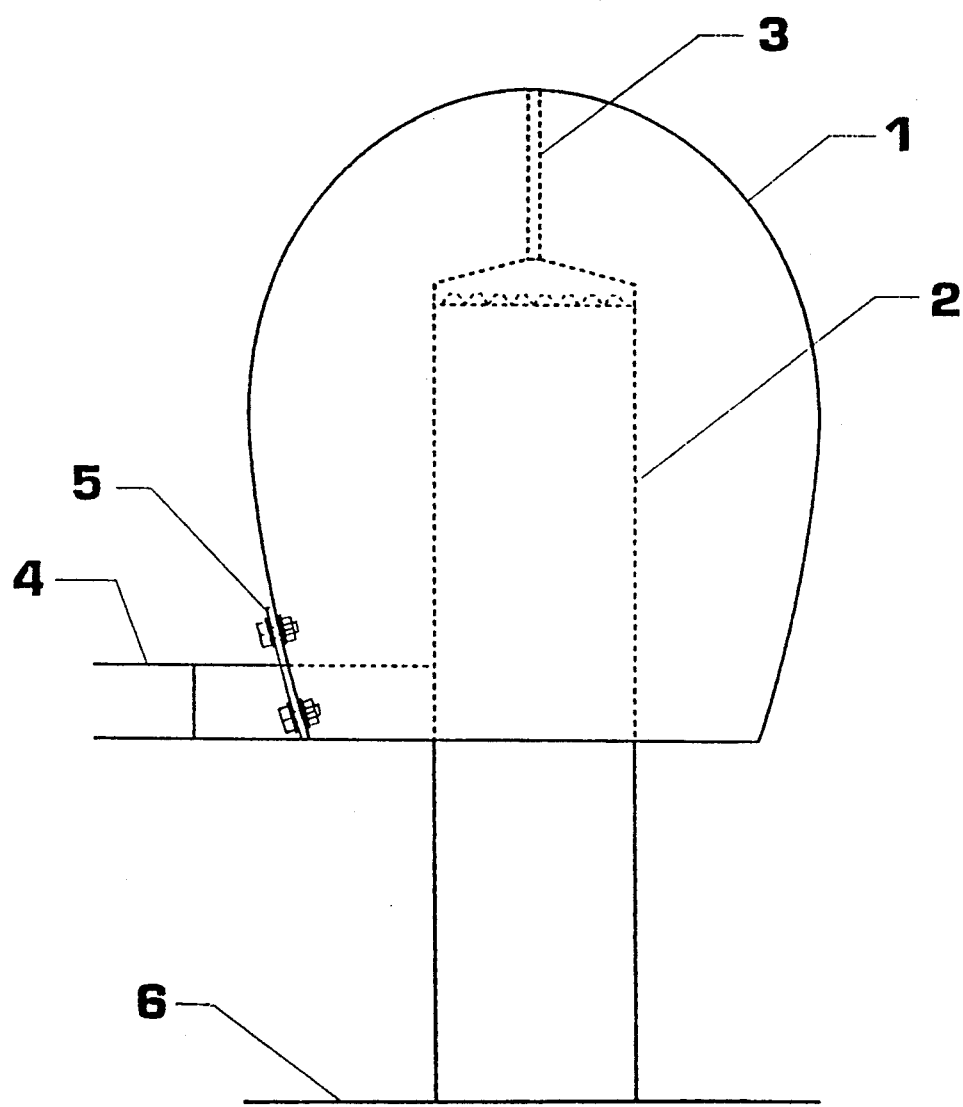

Referring now to the drawings in detail to promote an understanding of the principles of the invention.

Referring now to FIG. 1 a simplified perspective diagram of the entire wheel wall electrostatic generator detailing the spherical conductor 1 and the non conductive device 5 that is to be connected to the suspension 4 and the spherical conductor. The spherical conductor is connected to the suspension by a non conductive device to prevent energy loss and to help maintain the same distance from the pointed electrodes and the wheel at all times.

Figure 3:
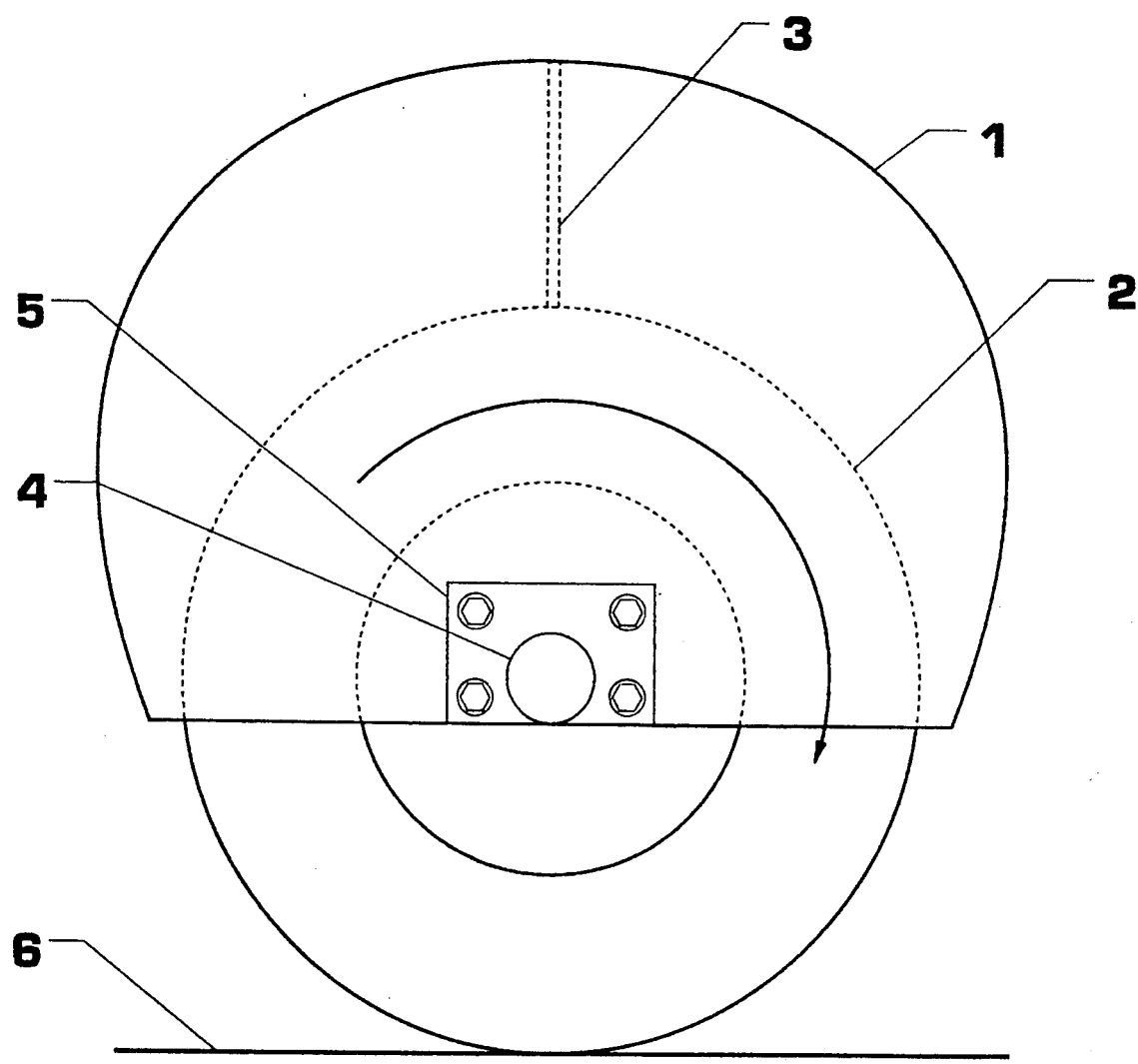

Referring now to FIG. 3 which is a side view of the pavement 6, wheel 2, spherical conductor 1, and the comb of pointed electrodes 3 to show the entire operation of the invention. The charge is applied to the wheel 2 made of insulated material by its motion over the pavement 6, the wheel then conveys the charge into the interior of the spherical conductor 1, where the charge is collected by a comb of pointed electrodes 3 that is connected to the spherical conductor 1, where the charge is accumulated on its surface.

What is claimed is:

1. An electrostatic generator for mounting inside a wheel wall of an automobile, comprising: a wheel for collecting electric charge from a pavement; comb electrode means contacting said wheel to collect electric charge therefrom; a spherical conductor; non-conductive means mounting the sperical conductor inside the wheel wall and means connecting the electrode means and the spherical conductor to transfer electrical charge from the electrode means to the spherical conductor.

* * * * *